(12) United States Patent
Kiso et al.

(10) Patent No.: US 9,555,770 B2
(45) Date of Patent: Jan. 31, 2017

(54) STEERING LOCK DEVICE

(71) Applicants: Alpha Corporation, Yokohama-shi, Kanagawa (JP); Nissan Motor Co., LTD., Yokohama-shi, Kanagawa (JP)

(72) Inventors: Toshikazu Kiso, Yokohama (JP); Takashi Yoshizawa, Yokohama (JP); Yoshio Watanuki, Atsugi (JP)

(73) Assignees: Alpha Corporation, Kanagawa (JP); Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/779,029

(22) PCT Filed: Mar. 7, 2014

(86) PCT No.: PCT/JP2014/055968
§ 371 (c)(1),
(2) Date: Sep. 22, 2015

(87) PCT Pub. No.: WO2014/162820
PCT Pub. Date: Oct. 9, 2014

(65) Prior Publication Data
US 2016/0052489 A1 Feb. 25, 2016

(30) Foreign Application Priority Data
Apr. 1, 2013 (JP) ................. 2013-075738

(51) Int. Cl.
*B60R 25/02* (2013.01)
*B60R 25/021* (2013.01)
*E05B 27/00* (2006.01)

(52) U.S. Cl.
CPC ... *B60R 25/02115* (2013.01); *B60R 25/02126* (2013.01); *B60R 25/02131* (2013.01); *E05B 27/00* (2013.01)

(58) Field of Classification Search
CPC .... B60R 25/02; B60R 25/021; B60R 25/0211; B60R 25/02113; B60R 25/02115; B60R 25/02126; B60R 25/02128; B60R 25/02131; B60R 25/02147; B60R 25/2063
See application file for complete search history.

(56) References Cited

U.S. PATENT DOCUMENTS 4,972,692 A * 11/1990 Morikawa ......... B60R 25/02102
70/186
6,076,382 A * 6/2000 Naganuma .............. B60R 25/02
70/186

(Continued)

FOREIGN PATENT DOCUMENTS

| JP | 03-90449 A | 4/1991 |
|---|---|---|
| JP | 10-61285 A | 3/1998 |
| JP | 11-105673 A | 4/1999 |

OTHER PUBLICATIONS

Official Communication issued in International Patent Application No. PCT/JP2014/055968, mailed on May 27, 2014.

*Primary Examiner* — Christopher Boswell
(74) *Attorney, Agent, or Firm* — Keating & Bennett, LLP

(57) ABSTRACT

The purpose of the present invention is to provide a steering lock device that can prevent improper access to a cylinder lock due to the deformation of a mounting hole formed in a cut-out shape. The steering lock device comprises: a frame (4) that is provided with a cylindrical section (1) open at one end, and that houses a lock body (3) which moves in and out of a steering column as a result of the manipulation of a cylinder lock (2) secured in the cylindrical section (1); and a mounted member (6) that is mounted in a mounting hole (5), one end of which opens to the open end of the cylindrical section (1) and is formed in a cut-out shape. At both side ends of the mounting hole (5), to-be-locked sections (9) are provided that regulate the widthwise deformation of the (Continued)

mounting hole (5) by locking circumferentially with locking sections (8) of an inserted member (7) which is inserted into the cylindrical section (1) within the frame (4).

6 Claims, 3 Drawing Sheets

(56) References Cited

U.S. PATENT DOCUMENTS

| | | | | |
|---|---|---|---|---|
| 6,349,579 B1 * | 2/2002 | Canard | ............. | B60R 25/02115 |
| | | | | 70/186 |
| 6,604,392 B1 * | 8/2003 | Kiso | ................. | B60R 25/02126 |
| | | | | 70/186 |
| 6,826,934 B2 * | 12/2004 | Canard | ............. | B60R 25/02131 |
| | | | | 70/181 |
| 6,931,896 B2 * | 8/2005 | Ochi | ................. | B60R 25/02113 |
| | | | | 70/182 |
| 7,669,444 B2 * | 3/2010 | Fernandez | ........ | B60R 25/02115 |
| | | | | 70/185 |
| 8,234,895 B2 * | 8/2012 | Nakamoto | .............. | B60R 25/02 |
| | | | | 70/182 |
| 8,499,596 B2 * | 8/2013 | Maltaverne | ....... | B60R 25/02126 |
| | | | | 70/186 |
| 9,083,077 B2 * | 7/2015 | Yagyu | ................. | B60R 25/2063 |
| 9,278,669 B2 * | 3/2016 | Yoshida | ............ | B60R 25/02126 |

* cited by examiner (a)

(b)

(c)

STEERING LOCK DEVICE

TECHNICAL FIELD

The present invention relates to a steering lock device.

BACKGROUND ART

A device described in Patent Document 1 has been known as a steering lock device configured such that a mounted member such as a switch is fixed to a frame housing a cylinder lock and a lock body.

In this conventional example, as shown in FIG. 15, the frame of the steering lock device is provided with an opening part (mounting hole) that is cut from a front open end of the frame, and a key detection switch is mounted in this mounting hole.

PRIOR ART DOCUMENT

Patent Document

Patent Document 1: Japanese Patent Application Publication No. Hei 10-61285

SUMMARY OF THE INVENTION

Problem to be Solved by the Invention

Here, in the above conventional example, the mounting hole is formed in a cut-out shape open at one end. For this reason, if a force is applied to the side edges of the mounting hole in a widening direction, the mounting hole is widened, which leads to a possibility of improper access to the cylinder lock inside.

The present invention has been made to solve the above drawback and an object thereof is to provide a steering lock device that can prevent improper access to a cylinder lock due to deformation of a mounting hole formed in a cut-out shape.

Means for Solving the Problem

According to the present invention, the above object is achieved by providing a steering lock device, including:

a frame 4 that includes a cylindrical section 1 open at one end, and that houses a lock body 3 which moves in and out of a steering column as a result of manipulation of a cylinder lock 2 fixed in the cylindrical section 1; and a mounted member 6 that is mounted in a mounting hole 5 which is formed in a cut-out shape in the cylindrical section 1 and open at one end to the open end of the cylindrical section 1, in which at opposite side edges of the mounting hole 5, to-be-locked parts 9 are provided that restrict deformation of the mounting hole 5 in a widening direction by being locked in a circumferential direction within the frame 4 with locking parts 8 of an inserted member 7 inserted in the cylindrical section 1.

In the present invention, the opposite side edges of the mounting hole 5 for the mounting of the mounted member 6 are locked with the locking parts 8 of the inserted member 7 and are practically in a coupled state, so that the cantilevered state is solved. This results in an increase in the resistance against external force that tries to widen the clearance between the opposite side edges of the mounting hole 5. Hence, it is possible to prevent improper access to the cylinder lock 2 inside due to deformation of the mounting hole 5.

Also, since the locking parts 8 and the to-be-locked parts 9 are locked inside the frame 4, access to their locking points can be effectively prevented as well.

Further, the mounted member 6 of the steering lock device can be configured such that it includes locking protrusions 11 that lock with locking grooves 10 formed in the inserted member 7 to thereby restrict detachment of the mounted member 6 in a radial direction of the frame 4.

The mounted member 6 may be fixed with appropriate additional fixing members to restrict its detachment in the radial direction of the frame 4. However, according to the present invention, the work of mounting the mounted member 6 can be done simply by: sub-assembling the mounted member 6 in advance such that the locking protrusions 11 locks with the locking grooves 10 of the inserted member 7; and then inserting this sub-assembly into the cylindrical section 1. Hence, the efficiency of the assembling is improved.

Also, while locking with the locking grooves 10 of the inserted member 7, the locking protrusions 11 are covered by the inserted member 7 and the frame 4. Thus, it is possible to prevent an improper destructive act of attacking the locking protrusions 11.

Further, the steering lock device can be configured such that the locking parts 8 are formed integrally with a case 12 of the cylinder lock 2.

For the inserted member 7, for example, a cap member or the like may be used that closes the front open end of the cylindrical section 1. However, by forming the locking parts 8 integrally with the case 12 of the cylinder lock 2, the case 12 of the cylinder lock 2 is formed as the inserted member 7. Hence, the configuration as a whole can be simplified.

Also, the steering lock device can be configured such that it includes:

a frame 4 that includes a cylindrical section 1 open at one end toward a front side;

a lock body 3 that moves in and out of a steering column as a result of manipulation of a cylinder lock 2 which is inserted in the cylindrical section 1 from the front open end thereof and fixed to the frame 4; and a key detection switch that is inserted into a mounting hole 5 in the cylindrical section 1 from the front open end thereof and that detects a state where an unlocking key is inserted in the cylinder lock 2, the mounting hole 5 being formed in a cut-out shape open to the front open end of the cylindrical section 1, in which a case 12 of the cylinder lock 2 is provided with locking parts 8 that, while the cylinder lock 2 is inserted in the cylindrical section 1, lock with to-be-locked parts 9 protruding from opposite side edges of the mounting hole 5, to thereby restrict widening of the mounting hole 5.

Effect of the Invention

According to the present invention, the opposite side edges of the mounting hole, which is formed in a cut-out shape, are coupled to each other by using the inserted member. This improves the resistance against the widening deformation of the mounting hole. Hence, it is possible to prevent improper access to the cylinder lock due to the deformation of the mounting hole.

MODE FOR CARRYING OUT THE INVENTION

Figure 1:
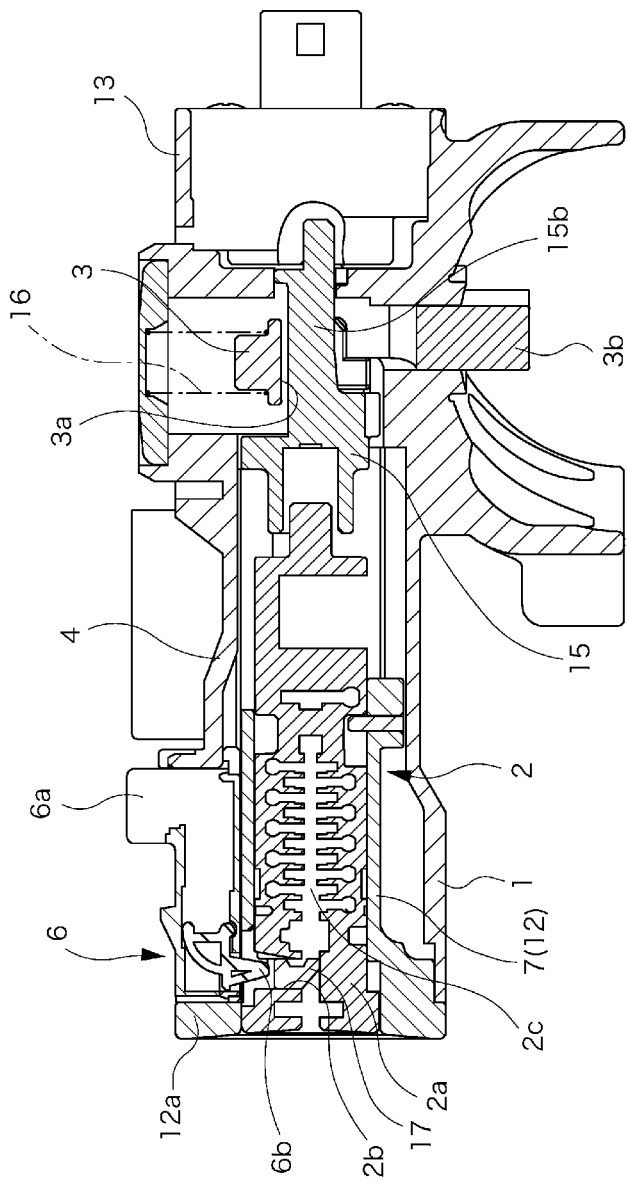
FIG. 1 is a cross-sectional view showing the present invention.

As shown in FIG. 1 and the following figures, a steering lock device includes a cylinder lock 2 housed in a frame 4 and an ignition switch 13 that is fixed to the frame 4 and performs switch operation when the cylinder lock 2 is manipulated. The steering lock device is fixed to a steering column not shown with a fixer member 14.

The cylinder lock 2 is formed by inserting a plug 2a into a case 12, and the plug 2a can be turned inside the case 12 with a correct unlocking key (not shown) inserted in the plug 2a. This cylinder lock 2 is inserted and mounted in a cylindrical section 1 of the frame 4 open at the front end thereof. At the front end of the case 12 of the cylinder lock 2, a cap section 12a is formed that has an outer diameter substantially equal to the outer diameter of the cylindrical section 1 and closes the front open end of the cylindrical section 1 when inserted in the cylindrical section 1. Through not shown, key position marks such as "LOCK," "ON," "ACC," and "START" are written on the cap section 12a.

A rotator 15 which can be coupled at the rear end to a rotational terminal (not shown) on the ignition switch 13 is coupled to the plug 2a of the cylinder lock 2 in a rotational direction. The ignition switch 13 can be manipulated through manipulation of turning the plug 2a to a predetermined key position.

Moreover, a cam part 15b is formed at a middle section of the rotator 15, and a lock body 3 is disposed with its follower part 3a in pressure contact with the cam part 15b. The lock body 3 is slidable in a direction perpendicular to the rotational center of the rotator 15, i.e. the plug 2a, and is urged by a compression spring 16 in a direction in which the follower part 3a is in pressure contact with the cam part 15b.

Thus, in this embodiment, when the plug 2a is at a "LOCK" position, a lock part 3b of the lock body 3 projects from the frame 4 as shown in FIG. 1 and locks with a steering shaft not shown inside the steering column, thereby restricting turning manipulation of the steering shaft.

In response to turning manipulation of the plug 2a in this state in an "ON" direction with the correct unlocking key, the lock part 3b is retracted into the frame 4, thereby unlocking the steering shaft.

Further, a key detection switch (mounted member 6) is mounted to the frame 4. As shown in FIG. 1, the key detection switch 6 includes a movable projection 6b projecting from a housing 6a with suitable urging force. The key detection switch 6 is capable of detecting whether the movable projection 6b is in the projecting state or a retracted state, based on disconnection and connection of a contact not shown housed in the housing 6a.

For the purpose of mounting this key detection switch 6, a mounting hole 5 is bored in the frame 4, penetrating from the outer surface of the frame 4 to the inside of the frame 4. The movable projection 6b comes in contact with the plug 2a while the key detection switch 6 is mounted in the mounting hole 5. A slider housing hole 2b is bored in the plug 2a in a region where the plug 2a comes in sliding contact with the movable projection 6b. The slider housing hole 2b positionally coincides with the movable projection 6b when the plug 2a is at the "LOCK" position. A slider piece 17 is mounted in the slider housing hole 2b movably in the radial direction.

As shown in FIG. 1, while the plug 2a is at the "LOCK" position without the unlocking key inserted in a key insertion groove 2c in the plug 2a, the movable projection 6b of the key detection switch 6 is projecting from the housing 6a. When the unlocking key is inserted in this state, the movable projection 6b is pushed by the unlocking key toward the outer periphery of the plug 2a, so that the key detection switch 6 detects the state where the unlocking key is inserted. If the driver, for example, tries to leave the vehicle in this state, a warning signal is outputted that informs the driver that the key is left inside.

Figure 2:
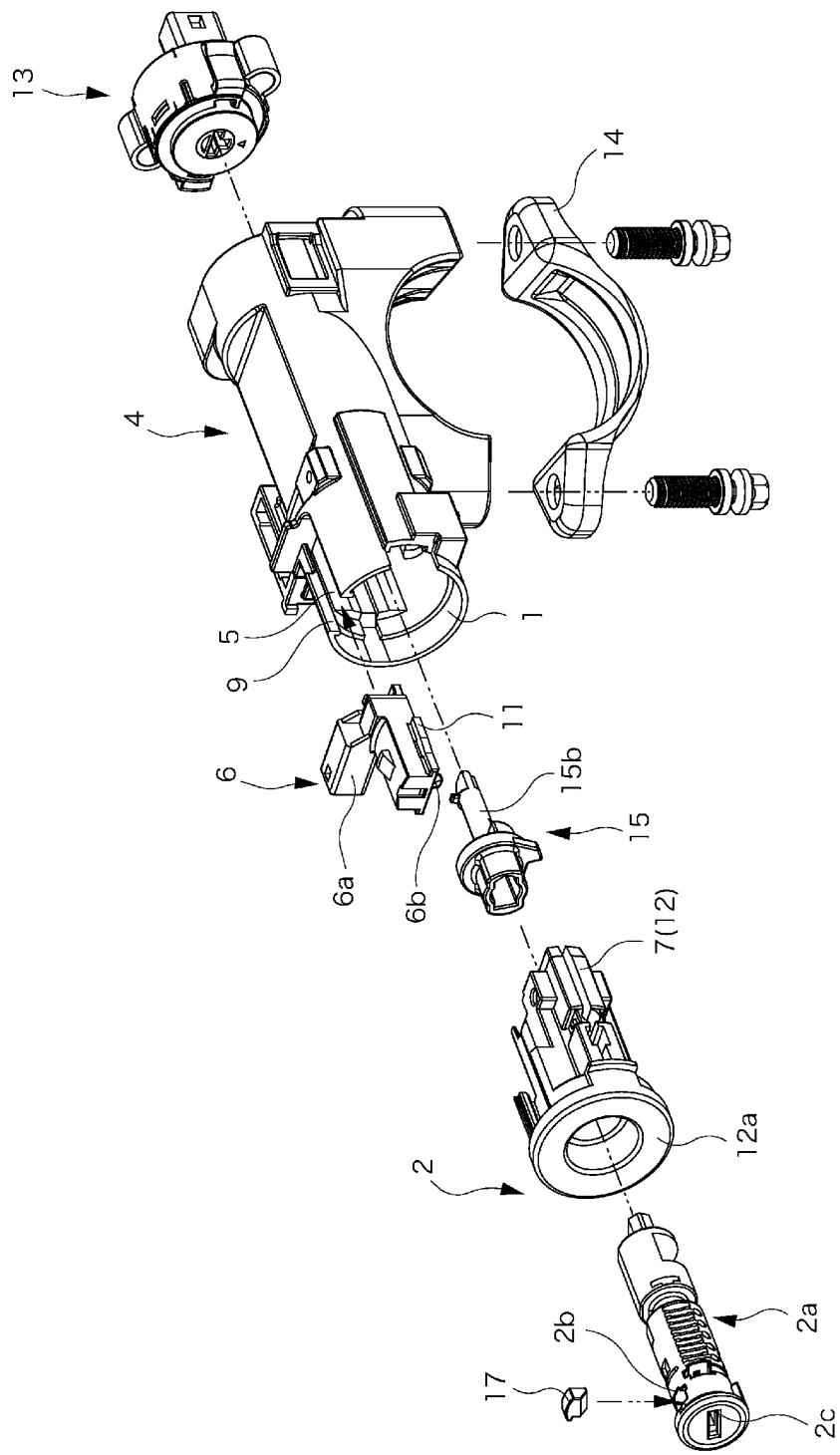
FIG. 2 is a perspective exploded view of FIG. 1.
Figure 3:
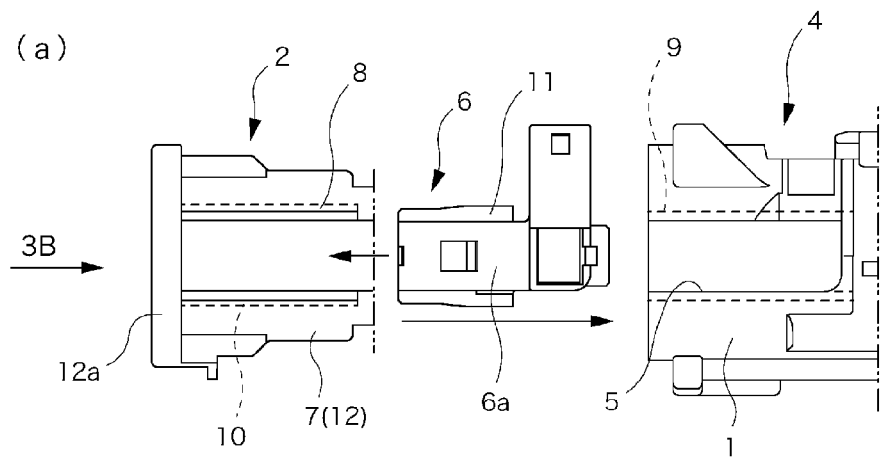
FIG. 3 is a set of views showing a mounted state of a mounted member, and part (a) is a side view, part (b) is a view seen in the direction of arrow 3B in part (a), and part (c) is a cross-sectional view of an assembled state.
Figure 3:
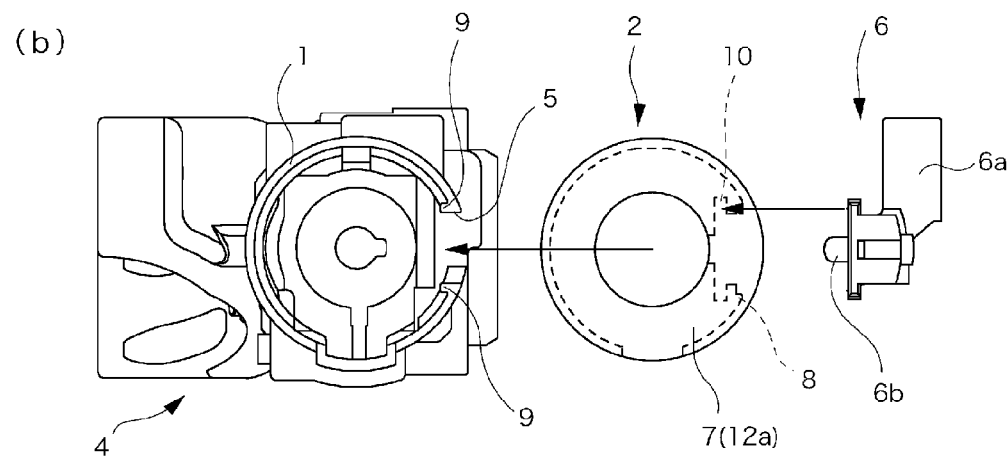
Figure 3:
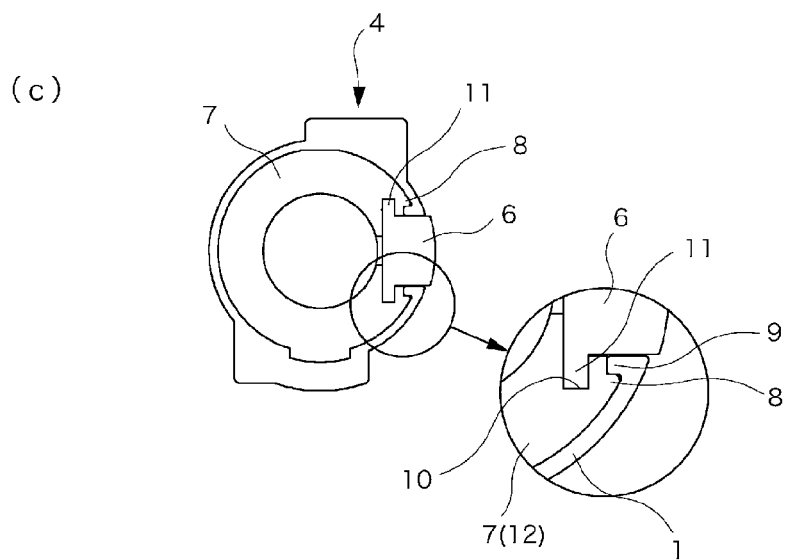

As shown in FIGS. 2 and 3, the mounting hole 5 for mounting the key detection switch 6 is formed in a cut-out shape open at one end to the open end side of the cylindrical section 1. The key detection switch 6 can be mounted by inserting it into the mounting hole 5 from this open end side.

Moreover, to-be-locked parts 9 are provided on opposite side edges of the mounting hole 5, the to-be-locked parts 9 protruding toward the center. On the other hand, locking parts 8 are provided on the case 12 of the cylinder lock 2, which is inserted into the cylindrical section 1 from the open end thereof. When the cylinder lock 2 is inserted, the to-be-locked parts 9 are locked with the locking parts 8 of the case 12, which functions as an inserted member 7, so that circumferential movement is restricted. This allows improved resistance against deformation of the mounting hole 5 that brings the opposite side edges of the mounting hole 5 outwardly away from each other and widens the mounting hole 5.

Further, the housing 6a of the key detection switch 6 includes locking protrusions 11 on opposite side edges of the lower end thereof, while locking grooves 10 with which the locking protrusions 11 can lock are formed in the case 12 of the cylinder lock 2. The key detection switch 6 is held at an appropriate position on the case 12 by sliding the locking protrusions 11 into the locking grooves 10.

Thus, in this embodiment, the key detection switch 6 is mounted by: firstly sub-assembling the key detection switch 6 such that it is held on the cylinder lock 2; and then inserting this sub-assembly into the cylindrical section 1 of the frame 4. In the state where the sub-assembly is inserted in the cylindrical section 1 and fixed to the frame 4, the locking of the locking protrusions 11 in the locking grooves 10 restricts radial movement of the key detection switch 6, and also the cap section 12a of the cylinder lock 2 restricts forward movement of the key detection switch 6. Hence, the key detection switch 6 is held at a predetermined position without using any fixing members such as screws.

Moreover, as described above, while the cylinder lock 2 is fixed, the locking grooves 10 and the to-be-locked parts 9 are coupled to each other by the locking parts 8, which reinforces the locking parts 9 and thereby prevents the deformation of the mounting hole 5 in the widening direction. Hence, improper access can be prevented.

EXPLANATION OF REFERENCE NUMERALS

1 Cylindrical Section
2 Cylinder Lock
3 Lock Body
4 Frame
5 Mounting Hole
6 Mounted Member
7 Inserted Member

8 Locking Part
9 To-Be-Locked Part
10 Locking Groove
11 Locking Protrusion
12 Case

The invention claimed is:

1. A steering lock device, comprising:
a frame that includes a cylindrical section open at one end, and that houses a lock body which moves in and out of a steering column as a result of manipulation of a cylinder lock fixed in the cylindrical section; and
a mounted member that is mounted in a mounting hole defined by a cut-out in the cylindrical section that extends in an axial direction of the cylindrical section to the open end of the cylindrical section, wherein
at opposite side edges of the mounting hole, to-be-locked parts are provided that restrict deformation of the mounting hole in a widening direction by being locked in a circumferential direction within the frame with locking parts of an inserted member inserted in the cylindrical section.

2. The steering lock device according to claim 1, wherein the mounted member includes a locking protrusion that locks with a locking groove formed in the inserted member to thereby prevent detachment of the mounted member in a radial direction of the frame.

3. The steering lock device according to claim 1, wherein the locking parts are formed integrally with a case of the cylinder lock.

4. The steering lock device according to claim 1, wherein the mounted member and the mounting hole are arranged such that the mounted member is inserted in the axial direction into the mounting hole from the open end of the cylindrical section.

5. A steering lock device, comprising:
a frame that includes a cylindrical section open at one end toward a front side;
a lock body that moves in and out of a steering column as a result of manipulation of a cylinder lock which is inserted in the cylindrical section from the front open end thereof and fixed to the frame; and
a key detection switch that is inserted into a mounting hole in the cylindrical section from the front open end thereof and that detects a state where an unlocking key is inserted in the cylinder lock, the mounting hole defined by a cut-out that extends in an axial direction of the cylindrical section to the front open end of the cylindrical section, wherein
a case of the cylinder lock is provided with locking parts that, while the cylinder lock is inserted in the cylindrical section, lock with to-be-locked parts protruding from opposite side edges of the mounting hole, to thereby restrict widening of the mounting hole.

6. The steering lock device according to claim 5, wherein the key detection switch and the mounting hole are arranged such that the key detection switch is inserted in the axial direction into the mounting hole from the open end of the cylindrical section.

* * * * *